Feb. 10, 1953  L. A. HURLEY ET AL  2,627,823
CLOVER-LEAF ROLL FORMER

Filed Feb. 24, 1950  3 Sheets-Sheet 1

Leonard A. Hurley
Pete F. Lucas
INVENTORS

Feb. 10, 1953   L. A. HURLEY ET AL   2,627,823
CLOVER-LEAF ROLL FORMER
Filed Feb. 24, 1950   3 Sheets-Sheet 2
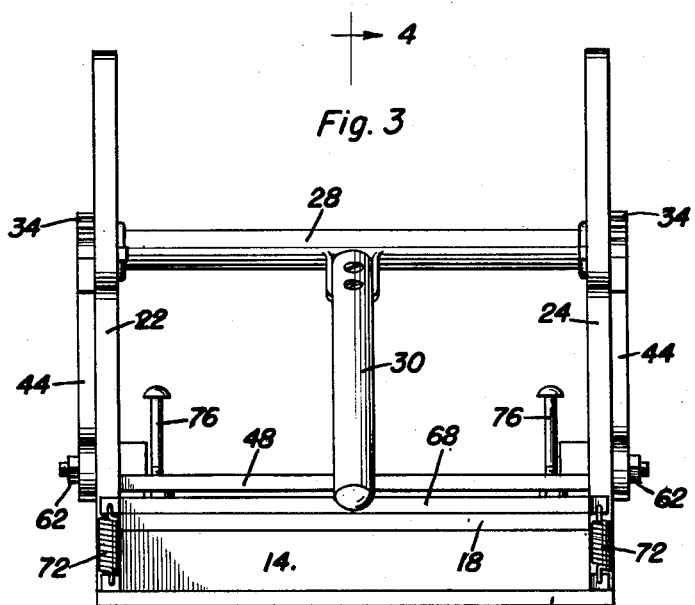
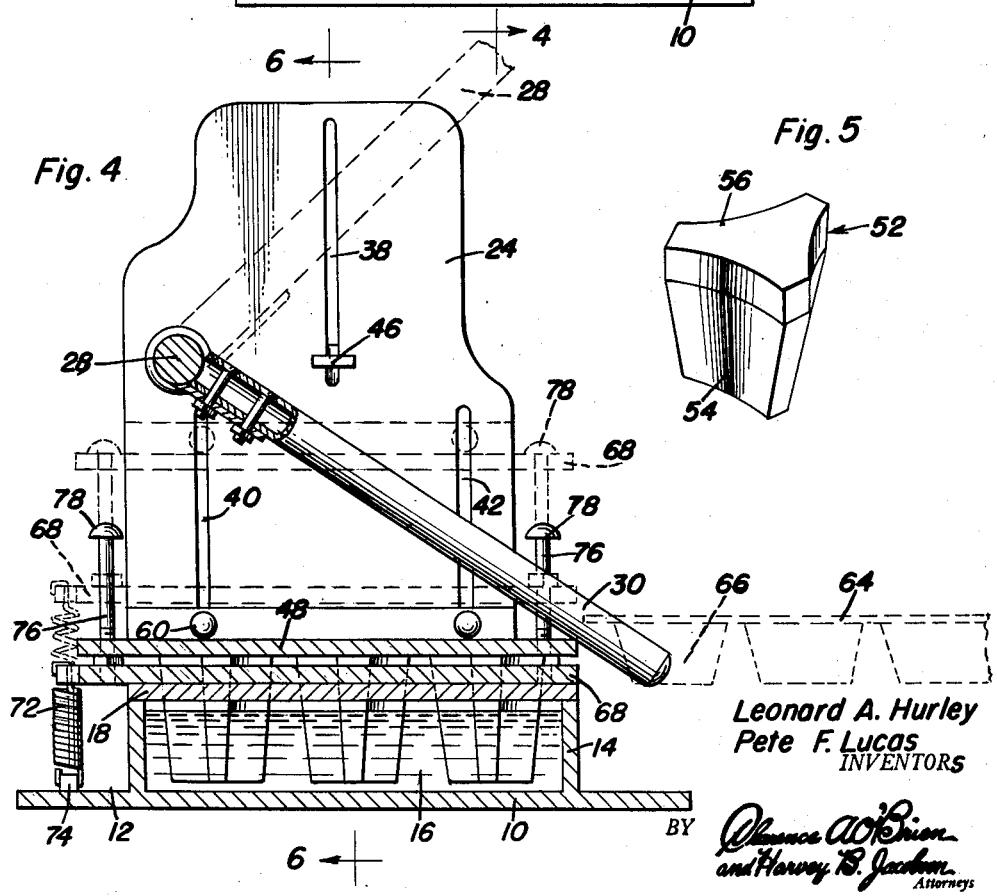
Leonard A. Hurley
Pete F. Lucas
INVENTORS Feb. 10, 1953 L. A. HURLEY ET AL 2,627,823
CLOVER-LEAF ROLL FORMER
Filed Feb. 24, 1950 3 Sheets-Sheet 3
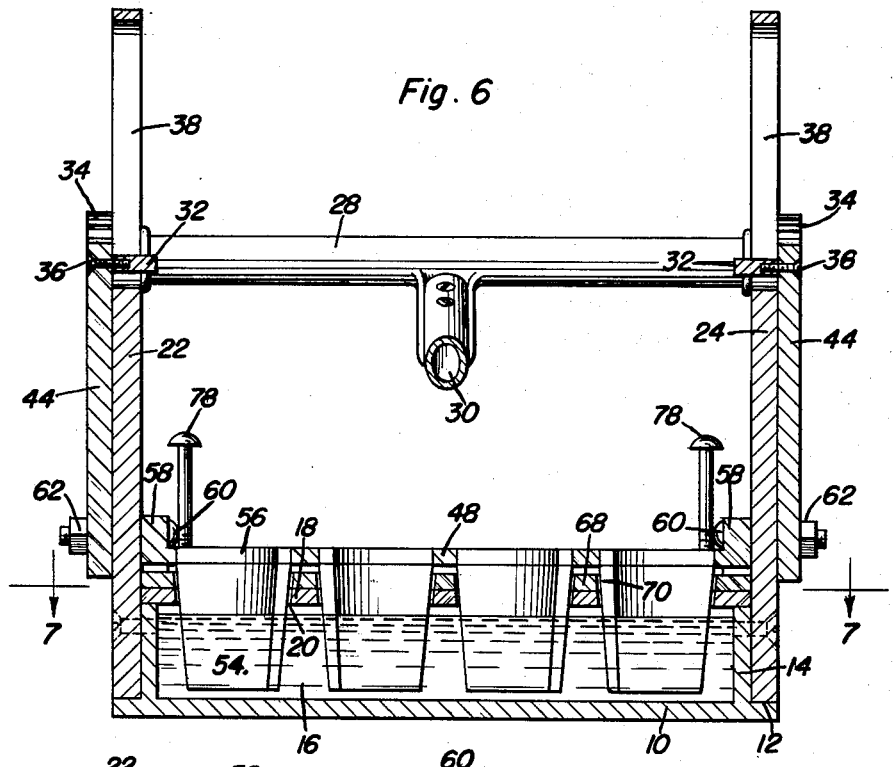
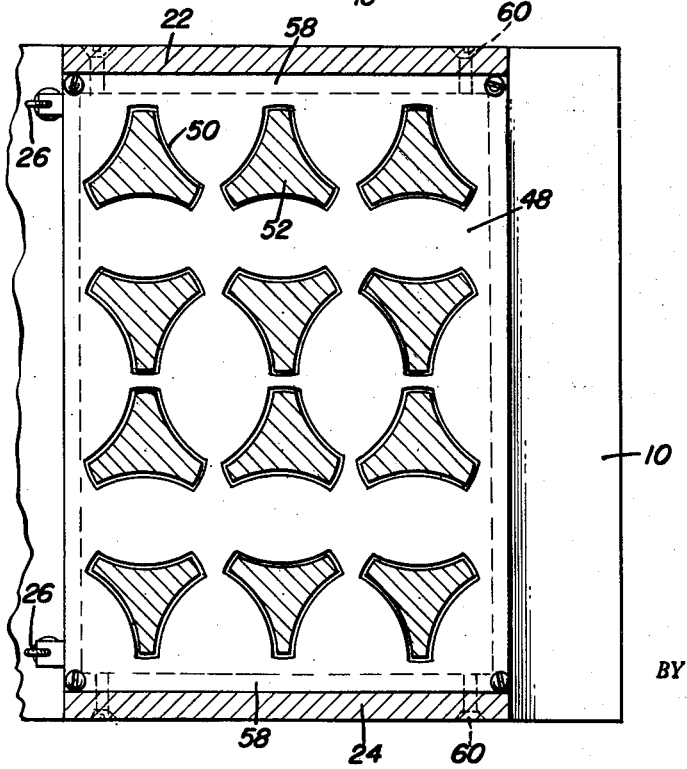
Leonard A. Hurley
Pete F. Lucas
INVENTORS Patented Feb. 10, 1953

2,627,823

UNITED STATES PATENT OFFICE 2,627,823

CLOVER-LEAF ROLL FORMER

Leonard A. Hurley and Pete F. Lucas, Dallas, Tex., assignors to Louis D. Houlis, Dallas, Tex.

Application February 24, 1950, Serial No. 146,058

8 Claims. (Cl. 107—8)

This invention relates to a novel machine the primary purpose of which is to grease and divide dough in one operation which dough upon subsequent baking will produce a clover-leaf-shaped roll.

An important object of this invention is to provide a machine which can either be operated by hand or driven by a motor to raise and lower a plate bearing dies for insertion in dough retained in a muffin pan or tin for forming the dough into a clover-leaf-shaped roll.

A still further object of this invention is to provide a device of the character described having an oil tray and means carried by the oil tray for selectively supporting a dough or muffin tin and also for receiving the dies for insertion in the oil tray.

A still further object of this invention is to provide a device of the character described having means for preventing the dough from adhering to the dies inserted in the dough so that the dough will be formed and remain within the recesses in the muffin or dough tin.

Another object of this invention is to provide a roll former comprising a housing having spaced vertical side members and an oil tray at the bottom thereof, a plate having dough engaging dies, means for raising and lowering said plate, means carried by said oil tray for selectively supporting a dough tin and for receiving said dies for insertion in the oil tray, and means for preventing the dough from being removed from said dough tin with said dies.

These together with various ancillary objects and features of the invention which will later become apparent as the following description proceeds, are attained by the device, a preferred embodiment of which has been illustrated by way of example only in the accompanying drawings, wherein:

Figure 3 is a front elevational view of the machine;

Figure 4 is a sectional view taken substantially in the plane of section line 4—4 of Figure 3;

Figure 5 is a perspective view of a die;

Figure 6 is a sectional view taken substantially in the plane of section line 6—6 of Figure 4; and Figure 7 is a fragmentary top plan view of the plate carrying the dies.

Specific reference will now be made to the drawings. In the several views in the accompanying drawings and in the following specification reference characters indicate corresponding elements throughout.

Figure 1:
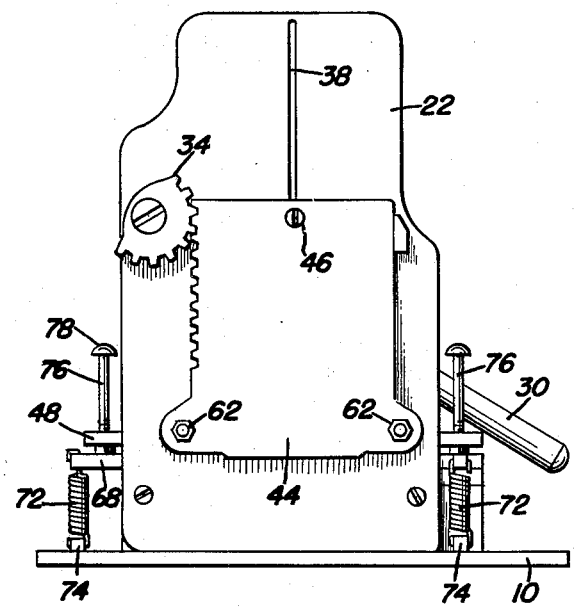
Figure 1 is a side elevational view of the assembled machine.
Figure 2:
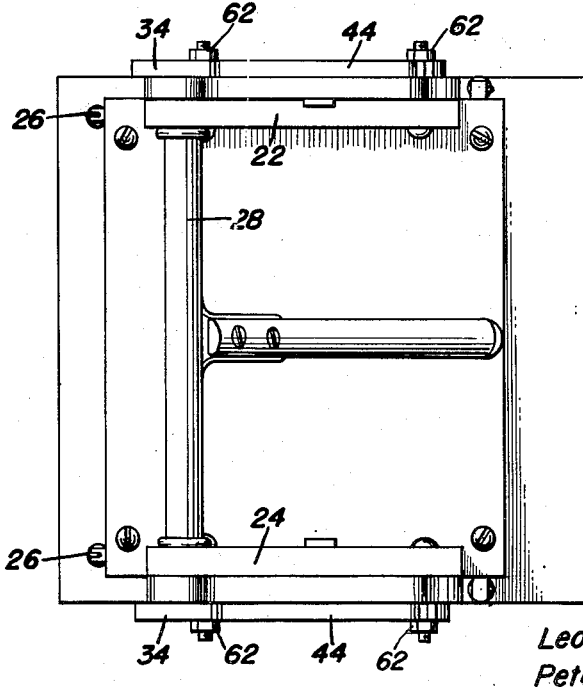
Figure 2 is a top plan view of the machine.

Indicated at 10 is a substantially rectangular base plate having a peripheral flange 12 and relatively short vertical walls 14 forming an oil tray or receptacle 16 upon which is supported a substantially rectangular plate 18 having spaced clover-leaf-shaped apertures 20. The function of plate 18 will be described hereinafter.

A pair of vertically extending side members or supports 22 and 24 are provided which are hinged as at 26 to the rear of the walls 14 of the oil tray so that in a closed position the bottom edges of the side plates 22 and 24 will rest upon the flange 12 of the base 10.

A shaft 28 extends between the side plates 22 and 24 and is provided with a forwardly extending crank arm 30. Stub-shafts 32 are carried by the shaft 28 and extend through suitable apertures in the rear of the plates 22 and 24 and at the outside of the plates pinions 34 are provided which are, in turn, secured to the sub-shafts 32 by means of suitable recessed screws 36. Thus it will be seen that the shaft 28 is rotatable on the side plates 22 and 24 and the pinions 34 rotate together with the shaft 28. It should be noted at this point that while a crank handle 30 has been shown for manually operating the shaft 28 and pinions 34, it will be obvious to those skilled in the art that a motor can be employed for rotating the shaft 28 if desired.

As will be seen clearly in Figure 4, each of the side plates 22 and 24 are provided with vertically extending, transversely spaced elongated slots 38, 40 and 42 and racks 44 are carried on the outside faces of the side plates 22 and 24, the racks 44 being slidably retained upon the side plates by means of bolts 46 extending through the slots 38. Thus it will be seen that a rotation of the shaft 28 will raise or lower the racks 44 upon the side plates 22 and 24.

A die carrying plate 48 is provided which includes spaced clover-leaf-shaped apertures 50 for frictionally retaining clover-leaf-shaped dies 52. As shown clearly in Figure 5, the dies have arcuated downwardly inclined walls 54 arranged in the form of a clover-leaf and a reduced, slightly tapered upper wall 56 which is also in the form of a clover-leaf and is the portion of the die which is retained in the apertures 50 of the plate 48 mentioned immediately hereinabove. The die-bearing plate 48 has longitudinally extending flanges 58. Headed screws 60 extend through the flanges 58 and through the aforementioned elongated slots 40 and 42 of the side walls 22 and 24 and are retained on the racks 44 adjacent the bottom edges thereof by means of appropriate threaded nuts 62.

Thus it will be seen that raising and lowering the crank arm 30 will also raise and lower the dies 52 with relationship to the side members 22 and 24.

As mentioned earlier, the oil tray 16 supports at its top edges an apertured plate 18 having spaced apertures 20. This plate 18 serves to guide the dies 52 into the oil tray 16 when the dies are to be properly lubricated and also serves to support a muffin pan or tin 64 having the usual recesses 66 for retaining dough to be subsequently baked. It will, of course, be understood that the tin 64 is supported upon the plate 18 after the dies 52 have been properly oiled and retracted. Thereafter, when the dies are again lowered by means of the crank arm 30 they enter the recesses 66 of the tin and force the dough into the recesses 54 of the dies to form a clover-leaf-shaped roll or muffin.

To prevent the dough from sticking to the sides 62 and thereby being removed from the tin 64 the following means is provided. A plate 68 is provided having spaced apertures 70 also in the form of clover-leaf which is substantially rectangular and has apertures at its forward edges to receive springs 72 which are further anchored to eye lugs 74 carried by the base 10. These springs normally urge the plate 68 downwardly or toward the plate 18 on the oil tray 16. The plate 68 is further provided with upwardly extending screws or bolts 76 which extend through suitable apertures in the die-bearing plate 48, which screws are further provided with heads 78. Thus, after the dough in the tin 64 has been appropriately shaped into a clover-leaf arrangement, the handle or crank arm 30 is urged upwardly so that the die-bearing plate 48 is caused to move upwardly until it engages the head 78 on the screws 76 at which time the plate 68 moves with the plate 48 against tension of the springs 72. If the dough has adhered to the dies 52, it will be urged back into the recesses 66 of the tin 64 by means of the plate 68 and after the dough is clear of the oiled or greased dies 52, the plate 68 moves with the plate 48.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A clover-leaf roll former comprising an oil receptacle constituting a base, a pair of vertical supports rising from opposite sides of said receptacle, a die carrying plate vertically, reciprocably mounted on said supports and overlying said receptacle, means on said supports for vertically reciprocating said die plate a distance somewhat greater than the distance represented by the depth of the receptacle and the depth of a muffin pan, roll forming dies depending from said die plate and extending into said receptacle when the die plate is in its lowermost position, stripping means surrounding said dies and being secured to said die plate for limited relative movement therewith, resilient means interconnecting said stripping means and said receptacle to restrain the stripping means from movement for a portion of the upward movement of the die plate and pan supporting means mounted on said receptacle.

2. A clover-leaf roll former comprising an oil receptacle constituting a base, a pair of vertical supports rising from opposite sides of said receptacle, a die carrying plate vertically, reciprocably mounted on said supports and overlying said receptacle, means on said supports for vertically reciprocating said die plate a distance somewhat greater than the distance represented by the depth of the receptacle and the depth of a muffin pan, roll forming dies depending from said die plate and extending into said receptacle when the die plate is in its lowermost position, stripping means surrounding said dies and being secured to said die plate for limited relative movement therewith, resilient means interconnecting said stripping means and said receptacle to restrain the stripping means from movement for a portion of the upward movement of the die plate and pan supporting means mounted on said receptacle, said stripping means comprising a flat plate having apertures therein of a configuration identical to that of said dies, said dies slidably extending through said apertures.

3. A clover-leaf roll former comprising an oil receptacle constituting a base, a pair of vertical supports rising from opposite sides of said receptacle, a die carrying plate vertically, reciprocably mounted on said supports and overlying said receptacle, means on said supports for vertically reciprocating said die plate a distance somewhat greater than the distance represented by the depth of the receptacle and the depth of a muffin pan, roll forming dies depending from said die plate and extending into said receptacle when the die plate is in its lowermost position, stripping means surrounding said dies and being secured to said die plate for limited relative movement therewith, resilient means interconnecting said stripping means and said receptacle to restrain the stripping means from movement for a portion of the upward movement of the die plate and pan supporting means mounted on said receptacle, vertical supports being hinged to said receptacle for moving said die plate out of overlying relation with said receptacle.

4. A clover-leaf roll former comprising an oil receptacle constituting a base, a pair of vertical supports rising from opposite sides of said receptacle, a die carrying plate vertically, reciprocably mounted on said supports and overlying said receptacle, means on said supports for vertically reciprocating said die plate a distance somewhat greater than the distance represented by the depth of the receptacle and the depth of a muffin pan, roll forming dies depending from said die plate and extending into said receptacle when the die plate is in its lowermost position, stripping means surrounding said dies and being secured to said die plate for limited relative movement therewith, resilient means interconnecting said stripping means and said receptacle to restrain the stripping means from movement for a portion of the upward movement of the die plate and pan supporting means mounted on said receptacle, said stripping means comprising a flat plate having apertures therein of a configuration identical to that of said dies, said dies slidably extending through said apertures, said pan supporting means comprising a flat plate having apertures therein of a configuration identical to that of said dies, said dies being slidable through said apertures.

5. A clover-leaf roll former comprising an oil receptacle constituting a base, a pair of vertical supports rising from opposite sides of said receptacle, a die carrying plate vertically, reciprocably mounted on said supports and overlying said receptacle, means on said supports for vertically reciprocating said die plate a distance somewhat greater than the distance represented by the depth of the receptacle and the depth of a muffin pan, roll forming dies depending from said die plate and extending into said receptacle when the die plate is in its lowermost position, stripping means surrounding said dies and being secured to said die plate for limited relative movement therewith, resilient means interconnecting said stripping means and said receptacle to restrain the stripping means from movement for a portion of the upward movement of the die plate and pan supporting means mounted on said receptacle, said die plate having spaced apertures therein, headed fasteners slidably extending through said apertures and extending below said plate, said stripping means comprising a stripping plate disposed below said die plate and having apertures therein of a configuration identical to that of said dies, said stripping plate being secured to said fasteners.

6. A clover-leaf roll former comprising a flanged receptacle constituting a base, a pair of vertical supports rising from opposite sides of said receptacle, a die carrying plate vertically, reciprocably mounted on said supports and overlying said receptacle, roll forming dies depending from said die plate, means connected to said supports for vertically reciprocating said die plates upwardly a distance sufficient to permit the insertion of a muffin pan between the receptacle and the dies and downwardly a distance sufficient for the dies to extend into the receptacle, stripping means slidably engaging said dies and means securing said stripping means to said die plate for limited relative movement therebetween, means interconnecting said receptacle and said stripping means to restrain the stripping means from movement for a portion of the upward movement of the die plate and pan supporting means mounted on said receptacle.

7. A clover leaf roll former comprising a flanged receptacle constituting a base, a pair of vertical supports rising from opposite sides of said receptacle, a die carrying plate vertically, reciprocably mounted on said supports and overlying said receptacle, roll forming dies depending from said die plate, means connected to said supports for vertically reciprocating said die plates upwardly a distance sufficient to permit the insertion of a muffin pan between the receptacle and the dies and downwardly a distance sufficient for the dies to extend into the receptacle, stripping means slidably engaging said dies and means securing said stripping means to said die plate for limited relative movement therebetween, means interconnecting said receptacle and said stripping means to restrain the stripping means from movement for a portion of the upward movement of the die plate and pan supporting means mounted on said receptacle, said stripping means comprising a stripping plate having openings slidably receiving said dies, said securing means including headed fasteners vertically slidably mounted on said die plate and terminating therebeneath, said stripping plate being secured to the terminal ends of said fasteners.

8. A clover-leaf roll former comprising a flanged receptacle constituting a base, a pair of vertical supports rising from opposite sides of said receptacle, a die carrying plate vertically, reciprocably mounted on said supports and overlying said receptacle, roll forming dies depending from said die plate, means connected to said supports for vertically reciprocating said die plates upwardly a distance sufficient to permit the insertion of a muffin pan between the receptacle and the dies and downwardly a distance sufficient for the dies to extend into the receptacle, stripping means slidably engaging said dies and means securing said stripping means to said die plate for limited relative movement therebetween, means interconnecting said receptacle and said stripping means to restrain the stripping means from movement for a portion of the upward movement of the die plate and pan supporting means mounted on said receptacle, said stripping means comprising a stripping plate having openings slidably receiving said dies, said securing means including headed fasteners vertically slidably mounted on said die plate and terminating therebeneath, said stripping plate being secured to the terminal ends of said fasteners, said interconnecting means comprising a plurality of resilient springs disposed at spaced points around the periphery of said receptacle, said springs each having one end connected to said stripping plate and the other end connected to said receptacle.

LEONARD A. HURLEY.
PETE F. LUCAS.

REFERENCES CITED

The following references are of record in the file of this patent:

UNITED STATES PATENTS

| Number | Name | Date |
| --- | --- | --- |
| 1,291,168 | Ruger | Jan. 14, 1919 |
| 1,551,088 | Collis | Aug. 25, 1925 |
| 1,665,196 | Collis | Apr. 3, 1928 |
| 2,212,991 | Sobel | Aug. 27, 1940 |
| 2,234,525 | Guldbech | Mar. 11, 1941 |

FOREIGN PATENTS

| Number | Country | Date |
| --- | --- | --- |
| 442,452 | Germany | Mar. 31, 1927 |